(12) United States Patent
Fujitsu

(10) Patent No.: US 11,294,046 B2
(45) Date of Patent: Apr. 5, 2022

(54) RADAR APPARATUS AND SIGNAL PROCESSING METHOD

(71) Applicant: DENSO TEN Limited, Kobe (JP)

(72) Inventor: Seiya Fujitsu, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 306 days.

(21) Appl. No.: 16/355,109

(22) Filed: Mar. 15, 2019

(65) Prior Publication Data

US 2020/0003888 A1    Jan. 2, 2020

(30) Foreign Application Priority Data

Jun. 28, 2018  (JP) .............................. JP2018-122868

(51) Int. Cl.
  *G01S 13/72*    (2006.01)
  *G01S 7/35*     (2006.01)
  *G01S 7/41*     (2006.01)
  *G01S 13/32*    (2006.01)
  *G01S 13/931*   (2020.01)

(52) U.S. Cl.
  CPC ............ *G01S 13/726* (2013.01); *G01S 7/354* (2013.01); *G01S 7/415* (2013.01); *G01S 13/32* (2013.01); *G01S 13/931* (2013.01); *G01S 7/356* (2021.05)

(58) Field of Classification Search
  CPC ........ G01S 13/726; G01S 7/354; G01S 7/415; G01S 13/32; G01S 13/931; G01S 2007/356
  See application file for complete search history.

(56) References Cited

U.S. PATENT DOCUMENTS

| 5,519,618 A * | 5/1996 | Kastner ................ G08G 5/0026 |
| | | 701/120 |
| 9,103,671 B1 * | 8/2015 | Breed .................... G01S 13/931 |
| 2010/0321234 A1 * | 12/2010 | Goldman ............ G01S 13/9054 |
| | | 342/25 A |
| 2011/0187863 A1 * | 8/2011 | Glander ............. G06K 9/00805 |
| | | 348/148 |
| 2018/0120414 A1 * | 5/2018 | Alcalde ................. G01S 13/589 |
| 2018/0120419 A1 * | 5/2018 | Bialer ................... G01S 13/726 |
| 2018/0149739 A1 * | 5/2018 | Becker .................... G01S 19/40 |

FOREIGN PATENT DOCUMENTS

| JP | 2009-063440 A | 3/2009 |
| JP | 2014-202678 A | 10/2014 |

* cited by examiner

*Primary Examiner* — Donald H B Braswell
(74) *Attorney, Agent, or Firm* — Oliff PLC

(57) ABSTRACT

A radar apparatus includes: a derivation portion that derives an instantaneous value of a target; a tracking portion that tracks a single target based on a derivation result of the derivation portion; a lost process portion that performs a lost process to stop the single target from being tracked by the tracking portion; and a target classification portion that classifies the single target into a standstill target or a moving target; and, when the single target is the standstill target, the lost process portion suppresses generation of the lost process more greatly than when the single target is the moving target.

13 Claims, 6 Drawing Sheets

RADAR APPARATUS AND SIGNAL PROCESSING METHOD

CROSS-REFERENCE TO RELATED APPLICATIONS

This application is based on and claims priority under 35 USC 119 from Japanese Patent Application No. 2018-122868 filed on Jun. 28, 2018.

FIELD OF THE INVENTION

The present invention relates to a technique for tracking a target detected by a radar apparatus.

BACKGROUND OF THE INVENTION

Normally, a radar apparatus determines continuity about an instantaneous value of a target to thereby track the target. A continuity determination process executed in the radar apparatus is a process for determining whether there is continuity or not between an instantaneous value of a currently detected target and an instantaneous value of a previously detected target to thereby track the same target. In other words, the continuity determination process is a process for determining whether the currently detected target and the previously detected target are the same target or not to thereby track the same target. Incidentally, the continuity may be often determined not based on the previously detected instantaneous value per se but based on a processing result of various kinds of filtering performed thereon.

When it is determined that there is no continuity in the continuity determination process, an extrapolation process for virtually deriving an instantaneous value of a currently undetected target by prediction etc. using a kinetic model to thereby continue tracking of the same target is executed based on the previous processing result (e.g. see JP-A-2014-202678). When the instantaneous value of the target derived by the extrapolation process is data indicating that the target is present out of afield of view (FOV) of the radar apparatus, a lost process for stopping the tracking of the same target is executed.

SUMMARY OF THE INVENTION

Information of the target subjected to the lost process is not set as an output subject to an external system of AEB (Autonomous Emergency Braking) etc. Therefore, there is a problem that when a standstill object such as a parking block or a wall which has been once detected by the radar apparatus, for example, during backward parking falls out of the FOV, the standstill object cannot be recognized by the external system side.

In addition, the standstill object such as the parking block or the wall which has been detected once by the radar apparatus, for example, during the backward parking may fall out of the FOV and then fall into the FOV again. Since the lost process is executed as soon as the standstill object falls out of the FOV, the standstill object is detected as a new target when the standstill object falls into the FOV again. Therefore, there is a problem that priority as an output object to the external system may be lowered.

In consideration of the aforementioned problem, an object of the present invention is to improve tracking (standstill target tracking) performance for tracking a standstill target that is a tracking subject to be detected by a radar apparatus.

A radar apparatus according to the invention comprises: a derivation portion that derives an instantaneous value of a target; a tracking portion that tracks the same target based on a derivation result of the derivation portion; a lost process portion that performs a lost process to stop the same target from being tracked by the tracking portion; and a target classification portion that classifies the same target into a standstill target or a moving target; wherein: when the same target is the standstill target, the lost process portion suppresses generation of the lost process more greatly than when the same target is the moving target (first configuration).

In the radar apparatus of the first configuration, it may be that, when the same target is the standstill target and a tracking position of the same target falls out of a detection region of the radar apparatus, the lost process portion prohibits generation of the lost process (second configuration).

In the radar apparatus of the second configuration, it may be that the radar apparatus is mounted on a mobile object together with another radar apparatus; and even when the same target is the standstill target and the tracking position of the same target falls out of the detection region of the radar apparatus, the lost process portion exceptionally does not prohibit generation of the lost process if the tracking position of the same target falls into a detection region of the other radar apparatus (third configuration).

In the radar apparatus of the second or third configuration, it may be that even when the same target is the standstill target and the tracking position of the same target falls out of the detection region of the radar apparatus, the lost process portion exceptionally does not prohibit generation of the lost process if the same target is not a fixture to a land (fourth configuration).

The radar apparatus of any one of the first to fourth configurations may further comprises: a non-volatile storage portion that stores information of the standstill target detected by the radar apparatus immediately before the radar apparatus is powered OFF; wherein: when the radar apparatus is powered ON again, the tracking portion uses the information stored in the non-volatile storage portion (fifth configuration).

The radar apparatus of the fifth configuration may further comprises: a change determination portion that determines whether a position of the radar apparatus has changed or not between immediately before the radar apparatus is powered OFF and when the radar apparatus has been powered ON again; wherein: when determination is made by the change determination portion that the position of the radar apparatus has changed, the tracking portion exceptionally does not use the information stored in the non-volatile storage portion even if the radar apparatus has been powered ON again (sixth configuration).

A signal processing method according to the invention is a signal processing method of a radar apparatus comprising a derivation step of deriving an instantaneous value of a target; a tracking step of tracking the same target based on a derivation result of the derivation step; a lost process step of performing a lost process to stop the same target from being tracked by the tracking step; and a target classification step of classifying the same target into a standstill target or a moving target; wherein: when the same target is the standstill target, the lost process step suppresses generation of the lost process more greatly than when the same target is the moving target (seventh configuration).

According to the present invention, it is possible to improve tracking (standstill target tracking) performance for tracking a standstill target that is a tracking subject to be detected by the radar apparatus.

DETAILED DESCRIPTION OF THE INVENTION

Illustrative embodiments of the present invention will be described below in detail with reference to the drawings.

1. Configuration of Radar Apparatus According to First Embodiment

Figure 1:
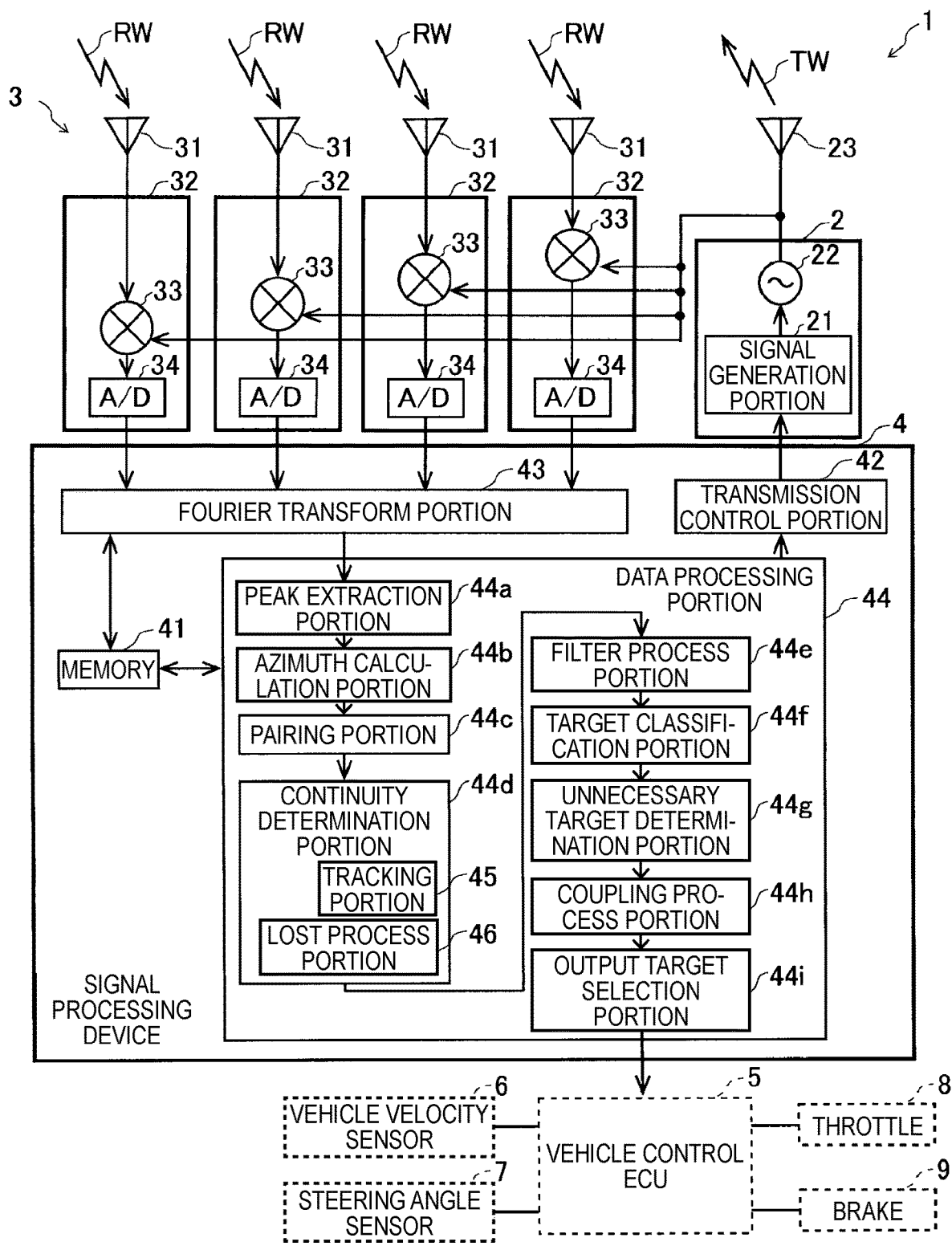
FIG. 1 is a view showing the configuration of a radar apparatus according to a first embodiment.

FIG. 1 is a view showing the configuration of a radar apparatus 1 according to a first embodiment. The radar apparatus 1 is mounted on a mobile object such as a vehicle. The vehicle on which the radar apparatus is mounted will be hereinafter referred to as "own vehicle". In addition, a straight travelling direction of the own vehicle, that is also a direction going from a driver's seat toward steering will be referred to as "front". Moreover, a straight travelling direction of the own vehicle, that is also a direction going from the steering toward the driver's seat will be referred to as "rear". In addition, a direction perpendicular to the straight travelling direction of the own vehicle and a vertical line, that is also a direction going from a right side of a driver facing the front toward a left side of the driver will be referred to as "leftward". Moreover, a direction perpendicular to the straight travelling direction of the own vehicle and the vertical line, that is also a direction going from the left side of the driver facing the front toward the right side of the driver will be referred to as "rightward".

The radar apparatus 1 uses an FMCW (Frequency Modulated Continuous Wave) to acquire target data relevant to any target present on a left front side of the own vehicle.

The radar apparatus 1 derives target data having parameters including a distance from reflection of the FMCW on the target to reception of the reflected wave thereof by each of reception antennas of the radar apparatus 1 (hereinafter referred to as "target distance") [m], relative velocity [km/h] of the target to the own vehicle, a target distance in the front/rear direction of the own vehicle (hereinafter referred to as "longitudinal position") [m], a target distance in the right/left direction of the own vehicle (hereinafter referred to as "lateral position") [m], etc. The longitudinal position is expressed as follows. When, for example, a position at which the radar apparatus 1 is mounted on the own vehicle is set as an origin O, the longitudinal position in front of the own vehicle is expressed by a positive value, and the longitudinal position at the rear of the own vehicle is expressed by a negative value. The lateral position is expressed as follows. When, for example, the position at which the radar apparatus 1 is mounted on the own vehicle is set as the origin O, the lateral position on the right side of the own vehicle is expressed by a positive value, and the lateral position on the left side of the own vehicle is expressed by a negative value.

As shown in FIG. 1, the radar apparatus 1 is mainly provided with a transmission portion 2, a reception portion 3, and a signal processing device 4.

The transmission portion 2 is provided with a signal generation portion 21 and a transmitter 22. The signal generation portion 21 generates a modulation signal in which voltage changes in the shape of a triangular wave, and supplies the generated modulation signal to the transmitter 22. The transmitter 22 frequency-modulates a signal of a continuous wave based on the modulation signal generated by the signal generation portion 21, generates a transmission signal in which frequency changes with the lapse of time, and outputs the generated transmission signal to a transmission antenna 23.

The transmission antenna 23 outputs a transmission wave TW based on the transmission signal from the transmitter 22. The transmission wave TW outputted by the transmission antenna 23 is the FMCW whose frequency fluctuates in a predetermined cycle. The transmission wave TW transmitted from the transmission antenna 23 to the left front side of the own vehicle is reflected as a reflected wave RW by an object such as a person or another vehicle.

The reception portion 3 is provided with a plurality of reception antennas 31 that form an array antenna, and a plurality of individual reception portions 32 that are connected to the plurality of reception antennas 31 respectively. In the present embodiment, for example, the reception portion 3 is provided with four reception antennas 31 and four individual reception portions 32. The four individual reception portions 32 correspond to the four reception antennas 31 respectively. Each of the reception antennas 31 receives the reflected wave RW from the object to acquire a reception signal. Each of the individual reception portions 32 processes the reception signal obtained by a corresponding one of the reception antennas 31.

Each of the individual reception portions 32 is provided with a mixer 33 and an A/D converter 34. The reception signal obtained by the reception antenna 31 is amplified by a low noise amplifier (not shown) and then sent to the mixer 33. The transmission signal sent from the transmitter 22 of the transmission portion 2 is inputted to the mixer 33, and the transmission signal and the reception signal are mixed in the mixer 33. Thus, a beat signal having a beat frequency as a difference between a frequency of the transmission signal and a frequency of the reception signal is generated. The beat signal generated by the mixer 33 is converted into a digital signal by the A/D converter 34, and then outputted to the signal processing device 4.

The signal processing device 4 is provided with a microcomputer including a CPU (Central Processing Unit) and a memory 41 etc. The signal processing device 4 stores various data into the memory 41 that is a storage device. The various data are set as subjects to be calculated. For example, the memory 41 is an RAM (Random Access Memory) etc. The signal processing device 4 is provided with a transmission control portion 42, a Fourier transform portion 43, and a data processing portion 44 as functions which are implemented as software by the microcomputer. The transmission control portion 42 controls the signal generation portion 21 of the transmission portion 2.

The Fourier transform portion 43 executes fast Fourier transform (FFT) on the beat signals outputted from the individual reception portions 32 respectively. Thus, the Fourier transform portion 43 converts each of the beat signals relevant to the reception signals of the reception antennas 31 respectively into a frequency spectrum that is data of a frequency region. The frequency spectrum obtained by the Fourier transform portion 43 is inputted to the data processing portion 44.

As shown in FIG. 1, the data processing portion 44 is provided with a peak extraction portion 44a, an azimuth calculation portion 44b, a pairing portion 44c, a continuity determination portion 44d, a filter process portion 44e, a target classification portion 44f, an unnecessary target determination portion 44g, a coupling process portion 44h and an output target selection portion 44i as main functions.

The peak extraction portion 44a extracts peak frequencies as peaks in a fast Fourier transform result performed by the Fourier transform portion 43, to output the extracted peak frequencies to the azimuth calculation portion 44b. Incidentally, the peak extraction portion 44a extracts the peak frequencies as for each of an UP section (section in which frequency of the transmission wave TW rises) and a DOWN section (section in which the frequency of the transmission wave TW drops).

The azimuth calculation portion 44b estimates an arrival angle of the reflected wave corresponding to each of the peak frequencies extracted in the peak extraction portion 44a, and calculates signal intensity (a reception level) at the peak frequency.

The pairing portion 44c obtains a correct combination of the UP section and the DOWN section based on the estimation result and the calculation result of the azimuth calculation portion 44b, and calculates a distance and relative velocity of each of the targets from the combination result. In addition, the pairing portion 44c outputs information (an instantaneous value of the target) including the estimated angle, the distance and the relative velocity of the target to the continuity determination portion 44d.

The continuity determination portion 44d determines whether there is continuity or not between the instantaneous value of the currently detected target and a previous processing result of the filter process portion 44e. The continuity determination portion 44d outputs the information about the target of the continuity determination portion to the filter process portion 44e. The continuity determination portion 44d is provided with a tracking portion 45 and a lost process portion 46. Details of processings executed by the tracking portion 45 and the lost process portion 46 respectively will be described later.

As for each detected target, the filter process portion 44e smooths the current instantaneous value whose continuity has been taken, and a prediction value by a predetermined weighting factor. When an α-β filter is used, the following expression is established. Incidentally, α is larger than 0 and smaller than 1. As for a new target whose continuity has not been taken, the prediction value is absent. Therefore, prediction value data in the following expression is replaced with the instantaneous value data.

Filtered Target Data=α×prediction value data+(1−α)×instantaneous value data

The filter process portion 44e may use any other filter than the α-β filter, such as a Kalman filter, an extended Kalman filter, an unscented Kalman filter or a particle filter. When, for example, the particle filter is used, the filter process portion 44e weights particles to more heavily weight a particle which is longer in distance between the current instantaneous value whose continuity has been taken and a predicted position of the particle. The filter process portion 44e then resamples the particles to delete particles weighted lightly and duplicate particles weighted heavily. A weighted average of the particles subjected to the resampling process is set as filtered target data. Incidentally, the distance between the current instantaneous value whose continuity has been taken and the predicted position of the particle may be any of an Euclidean distance and a statistical distance.

The filter process portion 44e outputs information about the filtered targets to the target classification portion 44f.

The target classification portion 44f classifies each of the targets into a moving object or a standstill object based on a filter process result etc. of the filter process portion 44e. The target classification portion 44f outputs the classification result to the unnecessary target determination portion 44g.

The unnecessary target determination portion 44g determines whether each target is an unnecessary target or not from a viewpoint of system control. For example, the unnecessary target is a phase wrap-around ghost etc. Incidentally, information of the target determined as unnecessary by the unnecessary target determination portion 44g is basically not outputted to an external apparatus but may be held internally. The unnecessary target determination portion 44g outputs the information of the target not determined as unnecessary, to the coupling process portion 44h.

Of the targets not determined as unnecessary by the unnecessary target determination portion 44g, the coupling process portion 44h groups targets each estimated as a reflection point from the same object into one target, and outputs the grouping result to the output target selection portion 44i.

The output target selection portion 44i selects any target that is required to be outputted to the external apparatus from the viewpoint of system control. For example, the output target selection portion 44i selects any target that has been tracked for a long period by the tracking portion 45 with priority, and minimizes the degree of priority of any newly detected target. The output target selection portion 44i outputs target information about the selected target to the external apparatus.

For example, the external apparatus is a vehicle control ECU 5. For example, the vehicle control ECU 5 is electrically connected to a vehicle velocity sensor 6, a steering angle sensor 7, a throttle 8, and a brake 9. The vehicle control ECU 5 performs vehicle control such as AEB, ACC (Adaptive Cruise Control) or PCS (Pre-Crash Safety System) based on the target information acquired from the radar apparatus 1.

2. Operation of Signal Processing Device

Figure 2:
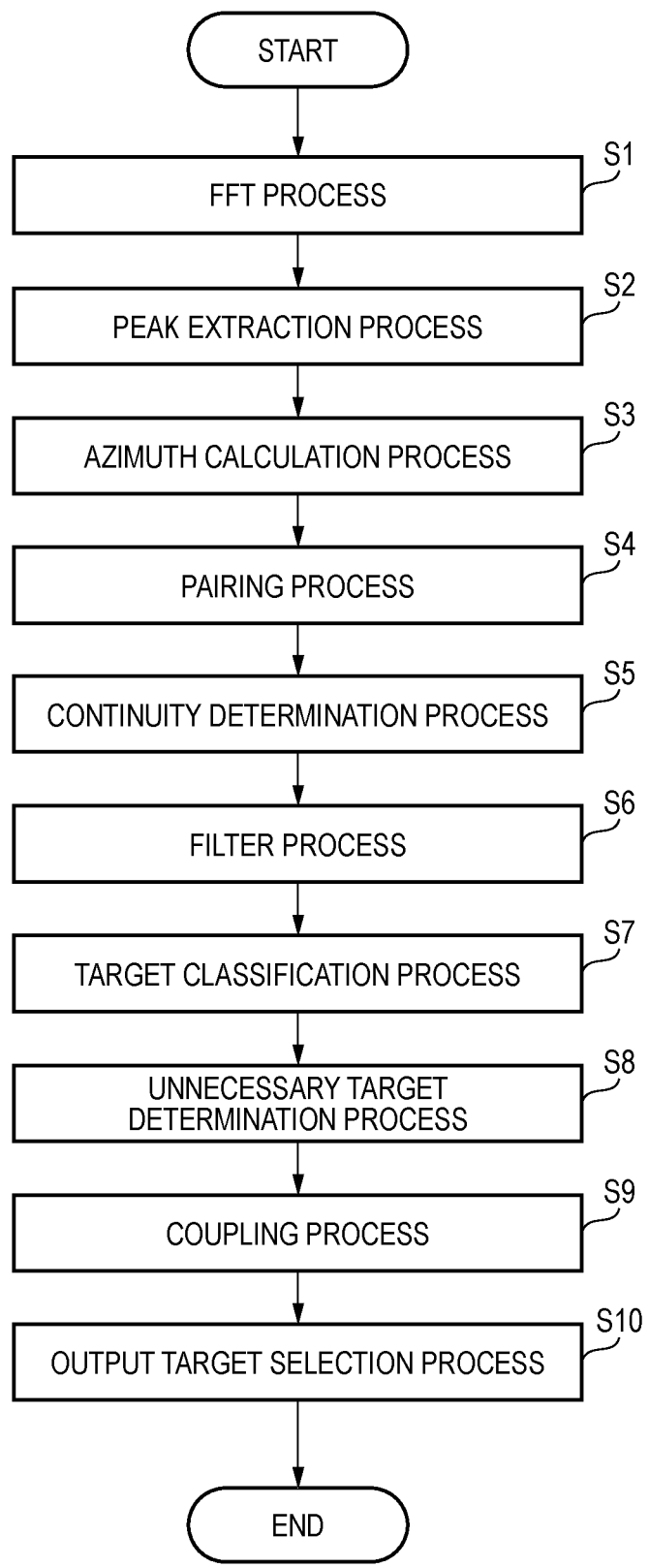
FIG. 2 is a flow chart showing operation of a signal processing device.

Next, operation of the signal processing device 4 will be described. FIG. 2 is a flow chart showing the operation of the signal processing device 4. The signal processing device 4 iterates processing shown in FIG. 2 cyclically every predetermined time (e.g. 1/20 second).

Before start of the processing shown in FIG. 2, control of the signal generation portion 21 performed by the transmission control portion 42 is completed. First, the Fourier transform portion 43 executes fast Fourier transform on beat signals outputted respectively from the individual reception portions 32 (step S1). A frequency spectrum of both the UP section and the DOWN section about each of the four reception antennas 31 is inputted from the Fourier transform portion 43 to the data processing portion 44.

Next, the peak extraction portion 44a extracts a peak frequency from the frequency spectrum (step S2). The peak extraction portion 44a extracts a frequency in which a peak having power exceeding a predetermined threshold appears as the peak frequency, from the frequency spectrum.

Next, the azimuth calculation portion 44b estimates angles of targets relevant to the signal of the extracted peak frequency by an azimuth calculation process. In the azimuth calculation process, angles and signal powers for the angles are derived from one peak frequency signal. Any well-known azimuth calculation process such as ESPRIT, MUSIC or PRISM can be used as the azimuth calculation process.

Figure 3:
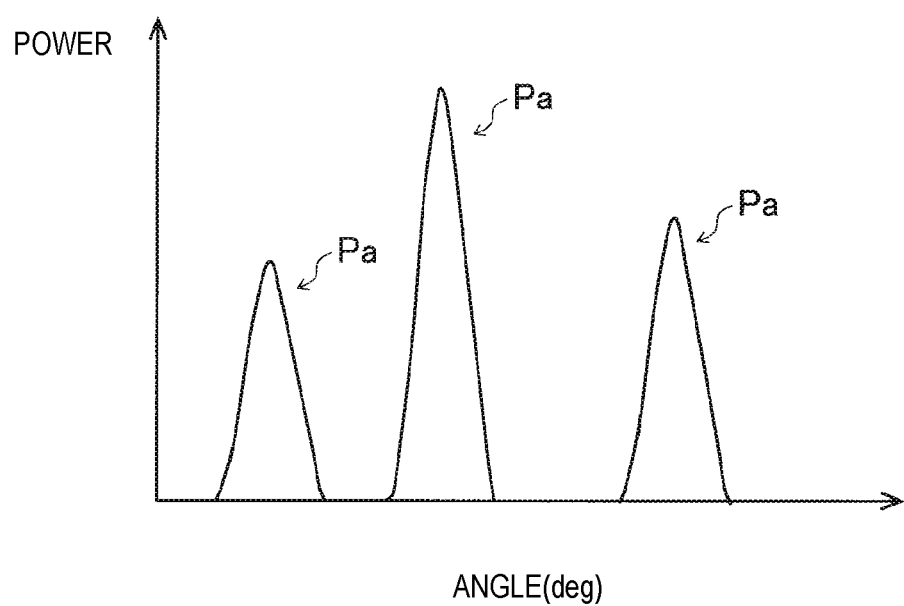
FIG. 3 is a graph showing examples of peak angles.

FIG. 3 is a graph conceptually showing angles estimated by the azimuth calculation process as an angle spectrum. In FIG. 3, the abscissa expresses angle (deg) and the ordinate expresses signal power. The angle (deg) is an angle between a frontward straight travelling direction of the own vehicle and a direction going from the radar apparatus 1 toward the target. Each of the angles estimated by the azimuth calculation process appears as a peak Pa in the angle spectrum. The angle estimated by the azimuth calculation process will be hereafter referred to as "peak angle" and the signal power for the peak angle will be hereinafter referred to as "angle power". The peak angles simultaneously derived thus from one peak frequency signal indicate angles of targets present at the same distance (distance corresponding to the peak frequency) from the radar apparatus 1.

The pairing portion 44c derives the peaks angles and the angle powers of the targets present at the same distance from the radar apparatus 1. Thus, the pairing portion 44c derives section data respectively corresponding to the targets present on the left front side of the own vehicle. The pairing portion 44c derives the section data having parameters including the peak frequency, the peak angle and the angle power, for each of the UP section and the DOWN section. The pairing portion 44c associates the section data of the UP section with the section data of the DOWN section to thereby obtain a correct combination of the UP section and the DOWN section (step S4). For example, the pairing portion 44c uses calculation using a Mahalanobis distance to associate two section data having similar parameters (peak frequency, peak angle and signal power).

Successively, the continuity determination portion 44d performs a continuity determination process based on a processing result of the pairing portion 44c (step S5). Then, the filter process portion 44e performs a filter process based on a processing result of the continuity determination process (step S6).

Successively, the target classification portion 44f performs a target classification process based on a processing result of the filter process (step S7). Then, the unnecessary target determination portion 44g performs an unnecessary target determination process based on a processing result of the target classification process (step S8).

The coupling process portion 44h performs a coupling process based on a processing result of the unnecessary target determination process (step S9). Finally, the output target selection portion 44i performs an output target selection process based on a processing result of the coupling process (step S10), and outputs target information of the targets selected as output subjects to the external apparatus. Then, the processing is terminated.

3. Outline of Continuity Determination Process

Figure 4:
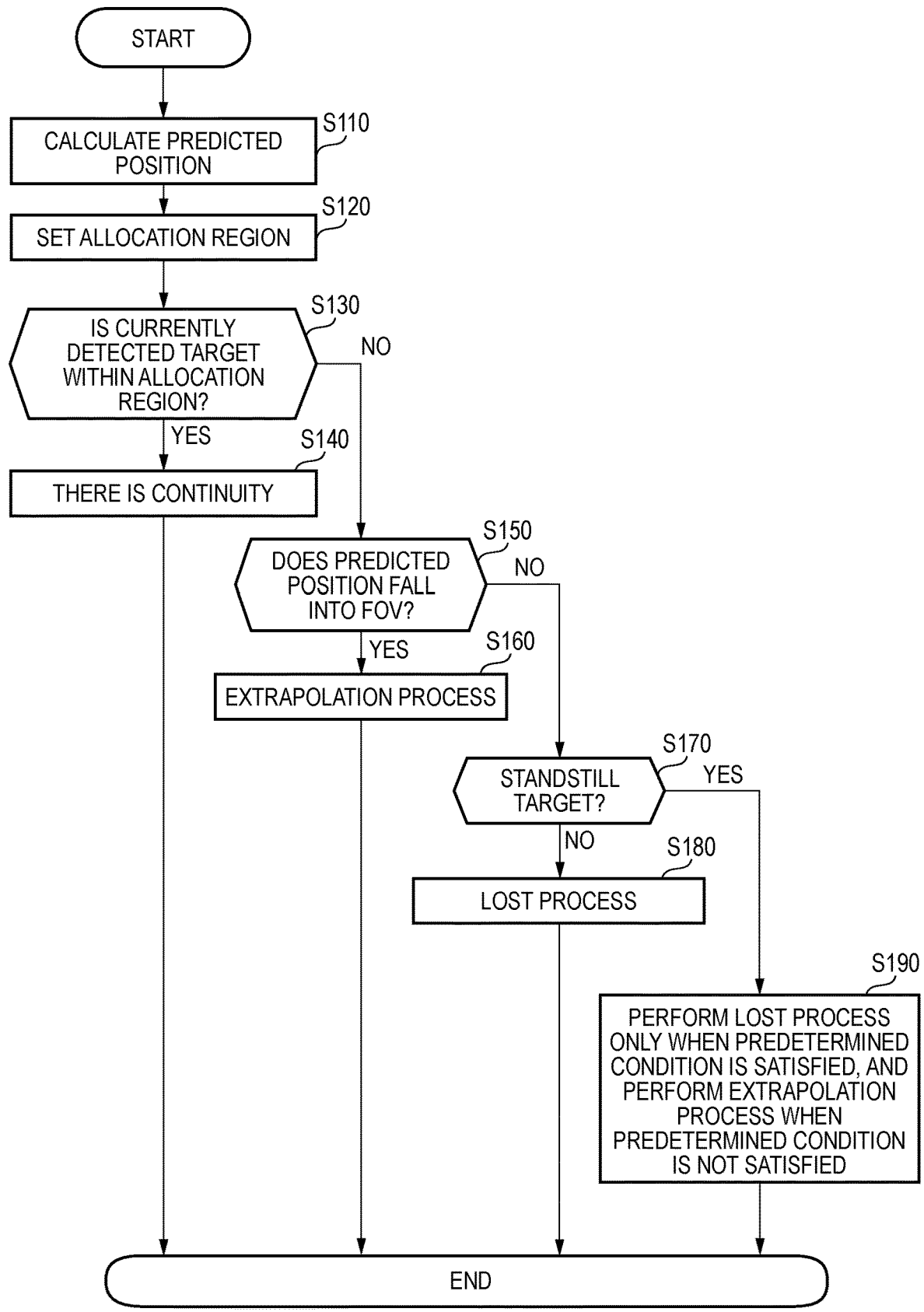
FIG. 4 is a flow chart showing an outline of a continuity determination process.

FIG. 4 is a flow chart showing an outline of the continuity determination process. The flow chart shown in FIG. 4 is executed on each of a previous processing result of the filter process portion 44e and a target subjected to a previous extrapolation process.

First, the tracking portion 45 calculates a predicted position in current detection of the previous processing result of the filter process portion 44e or the target subjected to the previous extrapolation process (hereinafter referred to as previous target) (step S110). That is, the current position is predicted based on a position and relative velocity of the previous target data.

Next, the tracking portion 45 sets an allocation region including the aforementioned predicted position (step S120). The allocation region may be shaped like a rectangle in which, for example, the aforementioned predicted position is the center of gravity in a two-dimensional plane when the own vehicle is looked down on.

When a currently detected target is within the allocation region (YES in the step S130), the tracking portion 45 determines that the currently detected target has continuity with the previous target (is the same target) (step S140). When the process of the step S140 is completed, the flow operation shown in FIG. 4 is terminated. Incidentally, when the currently detected target within the allocation region is also within another allocation region and allocated to the other allocation region, the flow operation may be shifted not to the step S140 but to a step S160.

On the other hand, when the currently detected target is not within the allocation region (NO in the step S130), the tracking portion 45 determines whether the aforementioned predicted position falls into an FOV or not (step S150).

When the aforementioned predicted position falls into the FOV (YES in the step S150), the tracking portion 45 performs an extrapolation process (the step S160). Specifically, the tracking portion 45 determines that the same target as the previous processing result of the filter process portion 44e is present in the aforementioned predicted position. Incidentally, the aforementioned predicted position used in the extrapolation process is not handled as an instantaneous value of the target in the filter process performed by the filter process portion 44e. When the process of the step S160 is completed, the flow operation shown in FIG. 4 is terminated.

On the other hand, when the aforementioned predicted position falls out of the FOV (NO in the step S150), the tracking portion 45 determines whether the previous target is a standstill target or a moving target (step S170). Incidentally, the tracking portion 45 uses a classification result of the target classification portion 44f to perform a determination process of the step S170.

When the previous target is a moving target (NO in the step S170), the lost process portion 46 performs a lost process (step S180). Specifically, the lost process portion 46 determines that the same target as the previous target has not been detected currently, so that the lost process portion 46 deletes the aforementioned predicted position from the memory 41. By the lost process, the tracking of the same target by the tracking portion 45 is stopped. When the process of the step S180 is completed, the flow operation shown in FIG. 4 is terminated.

On the other hand, when the previous target is a standstill target (YES in the step S170), the lost process portion 46 performs a lost process if a predetermined condition is satisfied, and the tracking portion 45 performs an extrapolation process if the predetermined condition is not satisfied (step S190). For example, a condition that the continuity determination portion 44d acquires information about a travelling locus of the vehicle from the vehicle control ECU 5, calculates a distance between the radar apparatus 1 and the previous target based on the acquired information, and concludes that the calculated distance is longer than a predetermined distance can be enumerated as the predetermined condition. In addition, a condition that the extrapolation process in the step S190 continues a predetermined number of times can be enumerated as another example of the predetermined condition. Incidentally, when the extrapolation process in the step S190 has been executed, the continuity determination portion 44d may acquire the information about the travelling locus of the vehicle from the vehicle control ECU 5 in the step S110 in a next cycle and the tracking portion 45 may calculate a predicted position based on the acquired information. When the process of the step S190 is completed, the flow operation shown in FIG. 4 is terminated.

Incidentally, the lost process may be executed when the extrapolation process continues the predetermined number of times. In addition, a currently detected target having no continuity with all previously detected targets and all previously extrapolated targets is a new target.

When the same target that is the tracking subject of the tracking portion 45 is a standstill target, the lost process portion 46 can suppress generation of the lost process by the processes of the aforementioned steps 170 to S190 more greatly than when the same target that is the tracking subject of the tracking portion 45 is a moving target. Accordingly, it is possible to improve tracking (standstill target tracking) performance for tracking a standstill target that is a tracking subject to be detected by the radar apparatus 1.

Thus, it is possible to solve a problem that when a standstill object such as a parking block or a wall which has been once detected by the radar apparatus, for example, during backward parking falls out of the FOV, the standstill object cannot be recognized by the external system side.

In addition, the standstill object such as the parking block or the wall which has been detected once by the radar apparatus, for example, during backward parking may fall out of the FOV and then fall into the FOV again. Since the lost process is executed as soon as the standstill object falls out of the FOV, the standstill object is detected as a new target when the standstill object falls into the FOV again. Therefore, there is a problem that priority as an output object to the external system may be lowered. This problem can be also solved.

Incidentally, the tracking portion 45 may always perform the extrapolation process in place of the process of the step S190. That is, the lost process portion 46 may prohibit generation of the lost process when the aforementioned predicted position falls out of the FOV (NO in the step S150) and the previous target is a standstill target (YES in the step S170). It is possible to improve the performance for tracking the standstill target more greatly by such modification.

Figure 5:
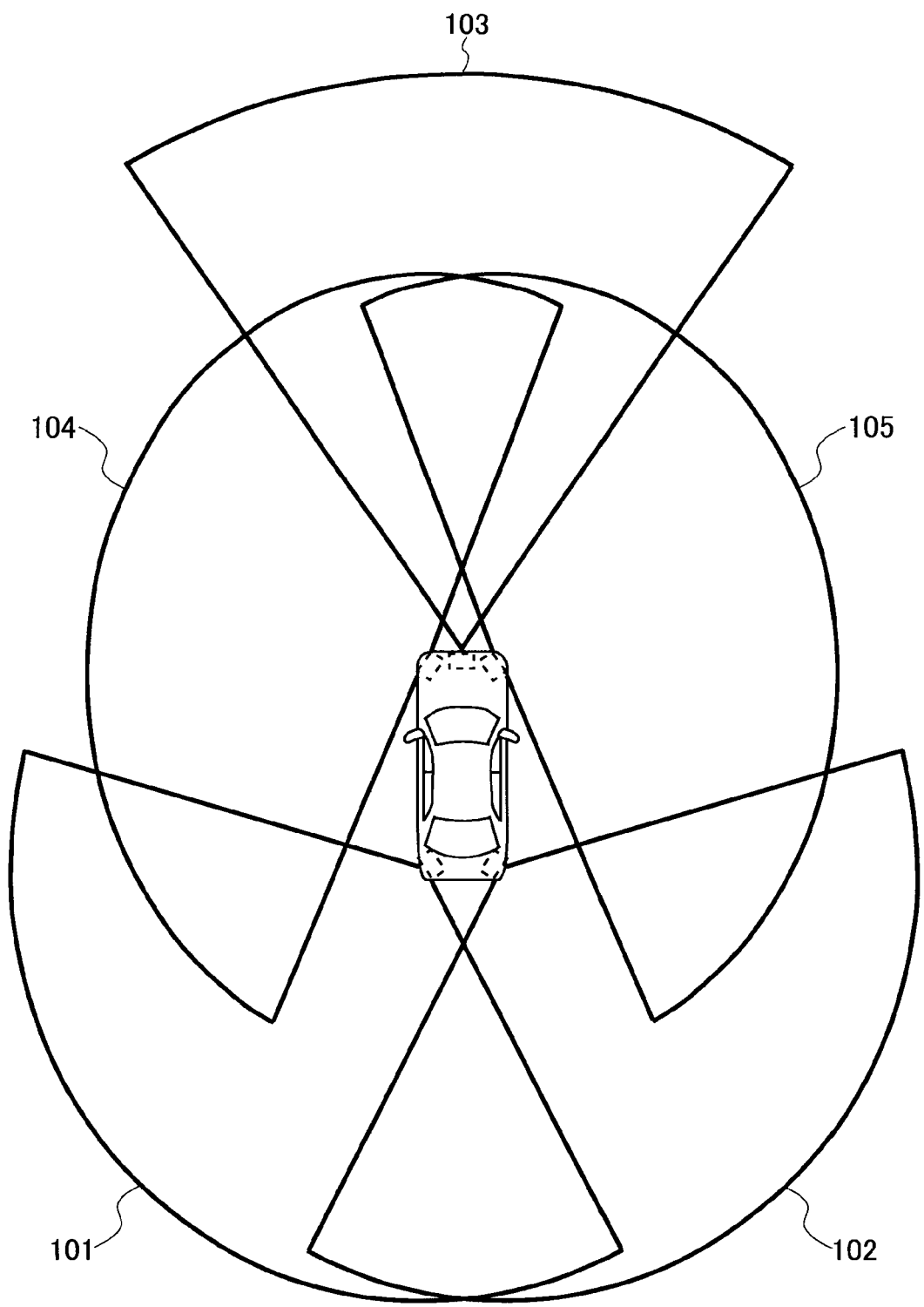
FIG. 5 is a bird's eye view showing each of FOVs of radar apparatuses.

Here, a plurality of radar apparatuses may be mounted on the vehicle. For example, five radar apparatuses are mounted on the vehicle shown in FIG. 5. A dotted-line rectangle in FIG. 5 designates each of the radar apparatuses. An FOV 101 in FIG. 5 is an FOV of the radar apparatus detecting any target present on the left rear side of the vehicle. An FOV 102 in FIG. 5 is an FOV of the radar apparatus detecting any target present on the right rear side of the vehicle. An FOV 103 in FIG. 5 is an FOV of the radar apparatus detecting any target present in the front of the vehicle. An FOV 104 in FIG. 5 is an FOV of the radar apparatus detecting any target present on the left front of the vehicle. An FOV 105 in FIG. 5 is an FOV of the radar apparatus detecting any target present on the right front of the vehicle.

A region that is out of an FOV of one radar apparatus but is within an FOV of another radar apparatus is present in FIG. 5. When a target within such a region is not tracked by the one radar apparatus but detected by the other radar apparatus, target data can be derived more accurately. Accordingly, although the tracking portion 45 performs an extrapolation process in principle in place of the process of the step S190, the lost process portion 46 may perform a lost process as an exception when the aforementioned predicted position is within the FOV of the other radar apparatus.

In the aforementioned first embodiment and the modification thereof, it is determined whether the previous target is a standstill target or a moving target in the step S170. However, there are two kinds of standstill targets, i.e. an object that can change to a moving target in the future, such as a parked vehicle, and a fixture to a land such as a parking block or a wall. It is not preferable to prohibit a lost process on the object which can change to the moving target in the future, such as the parked vehicle, because a ghost of the standstill target may continuously remain after the standstill target has changed to the moving target.

Accordingly, although the tracking portion 45 performs the extrapolation process in principle in place of the process of the step S190, the lost process portion 46 may perform the lost process as an exception when the previous target is not the fixture to the land but satisfies the predetermined condition. For example, a condition in which the extrapolation process performed in principle in place of the process of the step S190 continues a predetermined number of times may be used as the predetermined condition in this modification.

The method for determining whether the target determined as the standstill target in the step S170 is the fixture to the land or not is not particularly limited. For example, determination may be made with reference to the contents of grouping by the coupling process portion 44h, or determination may be made with reference to an image taken by a camera mounted on the vehicle.

4. Second Embodiment

Figure 6:
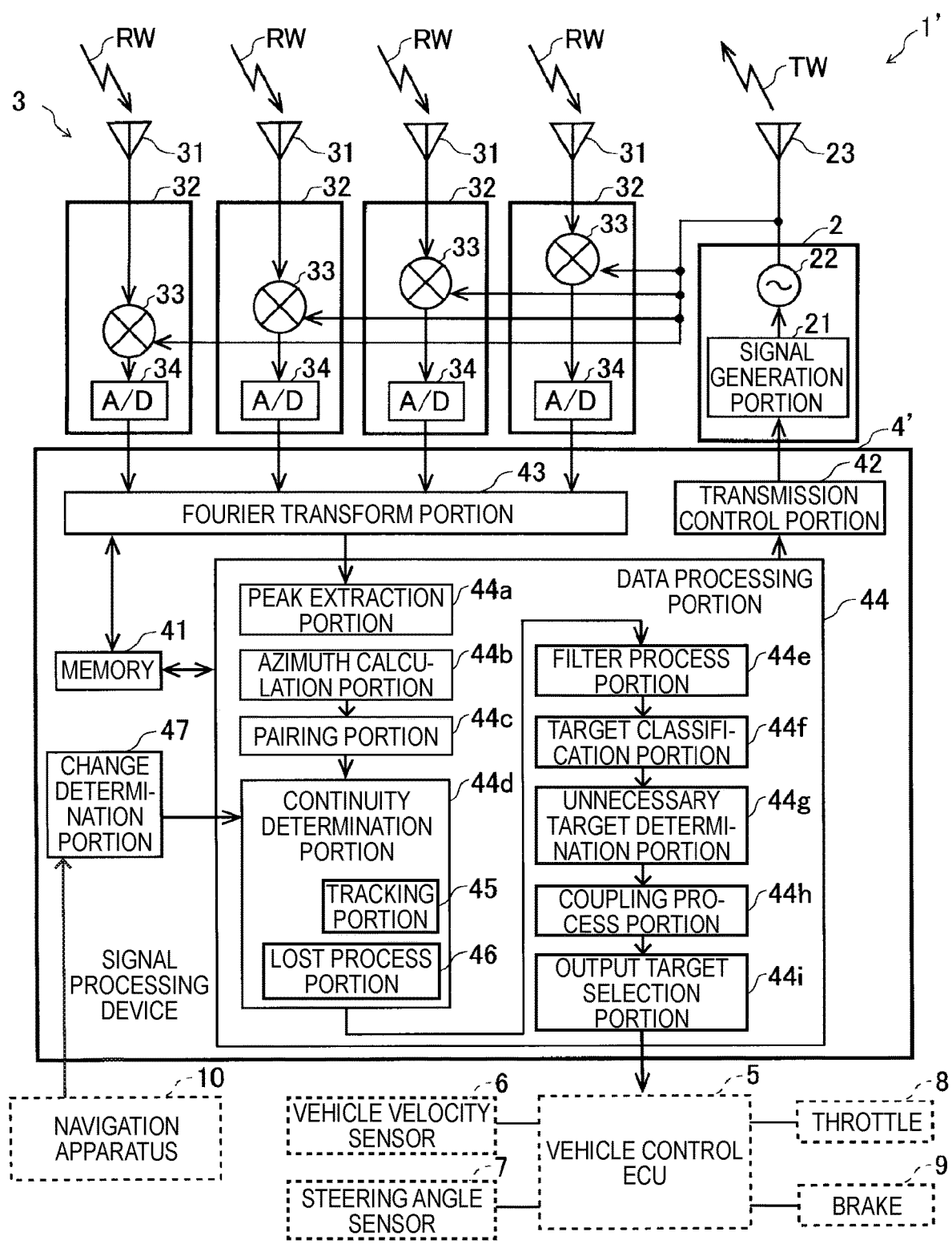
FIG. 6 is a view showing the configuration of a radar apparatus according to a second embodiment.

FIG. 6 is a view showing the configuration of a radar apparatus 1' according to a second embodiment. The radar apparatus 1' is configured to include a signal processing device 4' with which the signal processing device 4 in the radar apparatus 1 according to the first embodiment is replaced. The signal processing device 4' has a configuration in which a change determination portion 47 is added to the signal processing device 4. In addition, at least a portion of a memory 41 belonging to the radar apparatus 1' is a non-volatile such as a flash memory.

When an ignition switch or a power switch of an own vehicle is turned from ON to OFF, the radar apparatus 1' is also powered from ON to OFF. A data processing portion 44 non-volatilely stores information of a standstill target detected by the radar apparatus 1' into the memory 41 immediately before the radar apparatus 1' is powered OFF. Examples of the information of the standstill target include instantaneous data of the standstill target, extrapolation data (data obtained by an extrapolation process) of the standstill target, filter data (data obtained by a filter process) of the standstill target, etc. Incidentally, a predetermined flag is included in the information of the standstill target non-volatilely stored in the memory 41 immediately before the radar apparatus 1' is powered OFF. The predetermined flag is a flag meaning that the information of the standstill target has been non-volatilely stored in the memory 41 immediately before the radar apparatus 1' is powered OFF.

When the ignition switch or the power switch of the own vehicle is turned ON again, the radar apparatus '1 is also powered ON again. When the radar apparatus is powered ON again, a tracking portion 45 uses the information of the standstill target that has been non-volatilely stored in the memory 41. Accordingly, when the information of the standstill target has been non-volatilely stored in the memory 41 immediately before the radar apparatus 1' is powered OFF, the standstill target whose information has been non-volatilely stored in the memory 41 is processed as a previous target in a flow chart shown in FIG. 4 of a first cycle after the radar apparatus 1' is powered ON again. Therefore, a standstill target having continuity with the previous target can be detected in the first cycle after the radar apparatus 1' is powered ON again.

For example, the ignition switch or the power switch of the own vehicle is turned OFF after the own vehicle has entered a parking lot. The ignition switch or the power switch of the own vehicle is then turned ON again in order to enable the own vehicle to leave the parking lot. Thus, performance for tracking the standstill target in such a case can be improved.

However, when, for example, the own vehicle is towed away after the ignition switch or the power switch of the own vehicle has been turned OFF and until the ignition switch or the power switch of the own vehicle is turned ON again, an erroneous extrapolation process is performed by the flow chart that is executed as shown in FIG. 4 after the radar apparatus 1' is powered ON again.

Therefore, in the embodiment, the change determination portion 47 determines whether the position of the radar apparatus 1' has changed or not between immediately before the radar apparatus 1' is powered OFF and when the radar apparatus 1' has been powered ON again. When determination is made by the change determination portion 47 that the position of the radar apparatus has changed, the tracking portion 45 is configured exceptionally not to use the information of the standstill target including the aforementioned predetermined flag even if the radar apparatus has been powered ON again.

The determination method performed by the change determination portion 47 is not particularly limited. For example, position information of the own vehicle may be acquired from a navigation apparatus 10 mounted on the own vehicle as shown in FIG. 6, and determination as to whether the position of the radar apparatus 1' has changed or not may be made by use of the acquired position information. In addition, determination may be made that the position of the radar apparatus 1' has not changed, for example, when detection results of an ambient state detection sensor (the radar apparatus 1' itself, an on-vehicle camera, an LIDAR (Light Detection and Ranging), a clearance sonar, or the like) mounted on the own vehicle are similar between immediately before the radar apparatus 1' is powered OFF and when the radar apparatus 1' has been powered ON again. Setting of a similarity range in the determination depends on estimation of probability as to presence of a moving target around the own vehicle or detection characteristics of the ambient state detection sensor. For example, when a detection result of the on-vehicle camera is used, an object taken in a photographic image is recognized by image recognition technology. When the same standstill object is present between immediately before the radar apparatus 1' is powered OFF and when the radar apparatus 1' has been powered ON again, determination may be made that the standstill object falls into the similarity range.

5. Others

Various technological features disclosed in the description of the present invention can have various changes added without departing from the gist of technical creation of the present invention, in addition to the aforementioned embodiments. In addition, the embodiments and the modifications disclosed in the description of the present invention may be combined in a feasible range and carried out.

For example, the radar apparatus 1, 1' in each of the aforementioned embodiments is an FMCW-type radar apparatus. However, another type radar apparatus may be used. For example, an FCM (Fast-Chirp Modulation)-type radar apparatus may be used.

For example, the radar apparatus 1, 1' in each of the aforementioned embodiments is mounted on the vehicle. However, the radar apparatus 1, 1' may be mounted on another mobile object than the vehicle, such as a vessel or a flying object.

What is claimed is:

1. A radar apparatus comprising:
a transmitter that transmits a radio wave to a target;
a receiver that receives a radio wave reflected from the target; and
at least one processor configured to:
    derive an instantaneous value of the target based on the transmitted radio wave and the received radio wave;
    track a single target based on the derived instantaneous value of the target;
    classify the single target as a standstill target or not the standstill target, a tracking position of the single target moving outside of a detection region of the radar apparatus;
    upon classifying the single target as not the standstill target, perform a lost process to stop the single target from being tracked; and
    upon classifying the single target as the standstill target, prohibit performing of the lost process and continue tracking the single target by virtually deriving the instantaneous value of the single target.

2. The radar apparatus according to claim 1, wherein:
the radar apparatus is mounted on a mobile object together with another radar apparatus;
the tracking position of the single target falls into a detection region of the other radar apparatus; and
the at least one processor does not prohibit performing the lost process.

3. The radar apparatus according to claim 1, wherein:
the single target is not a fixture to a land; and
the at least one processor does not prohibit performing the lost process.

4. The radar apparatus according to claim 2, wherein:
the single target is not a fixture to a land; and
the at least one processor does not prohibit performing the lost process.

5. The radar apparatus according to claim 1, further comprising:
a non-volatile memory that stores information of the standstill target detected by the radar apparatus immediately before the radar apparatus is powered OFF; wherein:
the radar apparatus is powered ON again, and the at least one processor uses the information stored in the non-volatile memory.

6. The radar apparatus according to claim 2, further comprising:

a non-volatile memory that stores information of the standstill target detected by the radar apparatus immediately before the radar apparatus is powered OFF; wherein:
the radar apparatus is powered ON again, and the at least one processor uses the information stored in the non-volatile memory.

7. The radar apparatus according to claim 3, further comprising:
a non-volatile memory that stores information of the standstill target detected by the radar apparatus immediately before the radar apparatus is powered OFF; wherein:
the radar apparatus is powered ON again, and the at least one processor uses the information stored in the non-volatile memory.

8. The radar apparatus according to claim 4, further comprising:
a non-volatile memory that stores information of the standstill target detected by the radar apparatus immediately before the radar apparatus is powered OFF; wherein:
the radar apparatus is powered ON again, and the at least one processor uses the information stored in the non-volatile memory.

9. The radar apparatus according to claim 5, wherein the at least one processor is configured to:
determine whether a position of the radar apparatus has changed or not between immediately before the radar apparatus is powered OFF and the radar apparatus has been powered ON again; and
determine that the position of the radar apparatus has changed, and not use the information stored in the non-volatile memory upon the radar apparatus being powered ON again.

10. The radar apparatus according to claim 6, wherein the at least one processor is configured to:
determine whether a position of the radar apparatus has changed or not between immediately before the radar apparatus is powered OFF and the radar apparatus has been powered ON again; and
determine that the position of the radar apparatus has changed, and not use the information stored in the non-volatile memory upon the radar apparatus being powered ON again.

11. The radar apparatus according to claim 7, wherein the at least one processor is configured to:
determine whether a position of the radar apparatus has changed or not between immediately before the radar apparatus is powered OFF and the radar apparatus has been powered ON again; and
determine that the position of the radar apparatus has changed, and not use the information stored in the non-volatile memory upon the radar apparatus being powered ON again.

12. The radar apparatus according to claim 8, wherein the at least one processor is configured to:
determine whether a position of the radar apparatus has changed or not between immediately before the radar apparatus is powered OFF and the radar apparatus has been powered ON again; and
determine that the position of the radar apparatus has changed, and not use the information stored in the non-volatile memory upon the radar apparatus being powered ON again.

13. A signal processing method of a radar apparatus, the method comprising:
transmitting, by a transmitter, a radio wave to a target;
receiving, by a receiver, a radio wave reflected from the target;
deriving, by at least one processor, an instantaneous value of the target based on the transmitted radio wave and the received radio wave;
tracking, by the at least one processor, a single target based on the derived instantaneous value of the target;
classifying, by the at least one processor, the single target as a standstill target or not the standstill target, a tracking position of the single target being outside of a detection region of the radar apparatus;
upon classifying the single target as not the standstill target, performing, by the at least one processor, a lost process to stop the single target from being tracked; and
upon classifying the single target as the standstill target, prohibiting, by the at least one processor, performing of the lost process and continuing tracking the single target by virtually deriving the instantaneous value of the single target.

* * * * *